United States Patent
Combs (10) Patent No.: US 10,559,792 B1
(45) Date of Patent: Feb. 11, 2020

(54) STRUCTURALLY-INTEGRATED BATTERY PACK

(71) Applicant: Ampaire, Inc., Temecula, CA (US)

(72) Inventor: Cory Michael Combs, Temecula, CA (US)

(73) Assignee: Ampaire, Inc., Temecula, CA (US)

( * ) Notice: Subject to any disclaimer, the term of this patent is extended or adjusted under 35 U.S.C. 154(b) by 22 days.

(21) Appl. No.: 15/600,507

(22) Filed: May 19, 2017

(51) Int. Cl.
*H01M 10/052* (2010.01)
*H01M 2/10* (2006.01)
*H01M 10/613* (2014.01)
*H01M 10/625* (2014.01)
*H01M 10/6561* (2014.01)
*B64D 27/24* (2006.01)

(52) U.S. Cl.
CPC .......... *H01M 2/1083* (2013.01); *B64D 27/24* (2013.01); *H01M 2/1077* (2013.01); *H01M 2/1094* (2013.01); *H01M 10/613* (2015.04); *H01M 10/625* (2015.04); *H01M 10/6561* (2015.04); *B64D 2221/00* (2013.01); *H01M 2220/20* (2013.01)

(58) Field of Classification Search
CPC ........................ H01M 10/052; H01M 10/0525
See application file for complete search history.

(56) References Cited

U.S. PATENT DOCUMENTS

| | | | | |
|---|---|---|---|---|
| 5,352,545 | A | * | 10/1994 | Furukawa ........... H01M 2/1247 429/225 |
| 5,639,571 | A | * | 6/1997 | Waters ................ B60L 11/1874 180/68.5 |
| 7,531,270 | B2 | | 5/2009 | Buck |
| 2004/0211862 | A1 | | 10/2004 | Elam |
| 2006/0286450 | A1 | | 12/2006 | Yoon |
| 2012/0160583 | A1 | * | 6/2012 | Rawlinson .............. F41H 7/042 180/68.5 |

(Continued)

OTHER PUBLICATIONS

Bullis, Kevin, Building Cars Out of Batteries Isn't as Crazy as It Sounds, Oct. 29, 2013, retrieved from https://www.technologyreview.com/s/520716/building-cars-out-of-batteries-isnt-as-crazy-as-it-sounds/ (11 pages).

(Continued)

*Primary Examiner* — Olatunji A Godo
(74) *Attorney, Agent, or Firm* — Sheppard Mullin Richter & Hampton LLP (57) ABSTRACT

A structurally-integrated battery pack may comprise an outer skin, an inner skin, structural foam, battery cells, and/or other components. Structural foam may be disposed between the outer skin and the inner skin. The structural foam may include battery voids and/or one or more cooling channels. Battery cells may be disposed within the battery voids. The battery cells within the battery voids and the structural foam may form layers. The layers may comprise a first layer including a first structural foam layer, a second layer including a first battery disposed within a first battery void, a third layer including at least a partial structural foam layer, and/or other layers. The partial structural foam layer may at least partially form a cooling channel. The outer skin, the inner skin, the structural foam, and/or the battery cells may be incorporated into a structural or non-structural element of an aircraft and/or vehicle.

24 Claims, 7 Drawing Sheets

(56) References Cited

U.S. PATENT DOCUMENTS

2017/0015397 A1   1/2017   Mitchell

OTHER PUBLICATIONS

Kobza, Nathaniel, New battery design could bring life to all-electric, commercial airplanes, Sep. 27, 2016, retrieved from https://electrek.co/2016/09/27/new-battery-design-could-bring-life-to-all-electric-commercial-airplanes/ (18 pages).
Ladpli, Purim, et al., Design of Multifunctional Structural Batteries with Health Monitoring Capabilities, 8th European Workshop on Structural Health Monitoring (EWSHM 2016), Jul. 5-8, 2016, Spain, Bilbao (13 pages).

* cited by examiner

STRUCTURALLY-INTEGRATED BATTERY PACK

FIELD

The disclosure relates to a structurally-integrated battery pack for an aircraft and/or vehicle.

BACKGROUND

Electric and hybrid aircrafts and/or other high performance vehicles require high performance batteries. For aircrafts, light weight battery packs with high safety standards are imperative. Typical battery packs are rectangular and take up a large volume of space within the aircraft or vehicle. Obtaining enough energy for an aircraft would generally require a large number of batteries, occupying a large volume and adding significant weight making them unsuited for aircrafts.

Pouch battery cells are commercially available and offer energy dense battery cells in the form of a relatively thin and/or generally flat shape. Compared to typical cylindrical battery cells in a metallic case, the shape of pouch battery cells allows for greater packing efficiency with less weight. However, pouch battery cells may get too hot, swell, and/or catch on fire. Exposure to high temperatures and humidity may shorten the life of pouch battery cells. Pouch battery cells may also be less efficient in thermal management than cylindrical battery cells in a metallic case. In addition, emerging rigid prismatic battery cells made of composite-epoxy can help share structural loads and even more readily integrate into a structurally-integrated battery pack than pouch cells. These batteries have similar theoretical packing efficiency to pouch cells but with greater cooling difficulties, along with potential for additional toxic emissions from melting of the epoxy bonding agent during thermal runaway. In addition thickness of these cells is limited by the need to allow heat to escape.

SUMMARY

One aspect of the disclosure relates to an structurally-integrated battery pack, in accordance with one or more implementations. The structurally-integrated battery pack provides a uniquely light and safe structural battery pack for aircraft and/or other vehicles. The structurally-integrated battery pack in a panel form may take up less and/or no interior volume of the aircraft and/or vehicle when compared to existing designs. One or more structurally-integrated battery packs may be incorporated into one or more of the panels (e.g., lightly loaded panels), semi-monocoque or fully monocoque skin, leading edges, and/or structural spars of an aircraft and/or vehicle. The structurally-integrated battery pack may enable small and/or large aircraft (e.g., drones, private aircraft, commercial aircraft, etc.) to achieve electric flight with acceptable range, to power onboard electric systems in conventional aircraft, and/or to otherwise use electric power. In some implementations, the structurally-integrated battery pack may enable cars, trucks, boats, ships, and/or other high performance automobiles to achieve electric travel with acceptable range, power onboard electric systems, and/or otherwise use electric power.

Advances in energy dense battery cells (e.g., pouch battery cells, etc.) for automobiles and mobile devices may theoretically enable high performance battery electric aircraft, but previously existing battery pack designs and temperature management systems are too heavy, inefficient, and/or cause a multitude of safety issues for aircraft. Pouch battery cells are high energy and relatively thin battery cells, but they are prone to swelling and/or catching fire. The structurally-integrated battery pack described herein enables high performance battery electric aircraft that can achieve range and safety goals. The structurally-integrated battery pack described herein may integrate pouch cells (e.g., large format pouch cells) and/or other structural battery cells into aircraft and/or vehicle structure in a manner that greatly reduces pack weight penalty, provides efficient and low-weight integrated cooling, reduces fire risks, and/or eliminates the needs for bulky heavy battery packs.

The structurally-integrated battery pack described herein may include structural foam disposed between an outer and inner structural skin. The structural foam may be been machined or molded such that it contains battery voids of suitable size to insert battery cells. In some implementations, spongy foam may be bonded to the battery voids and/or to battery cells themselves in order to avoid load transfer from the structural foam to the cells. The battery cells used in the structurally-integrated battery pack may include pouch type batteries, cylindrical type batteries, and/or any other suitable batteries. The illustrations provided herein depict the pouch cell implementation but are not intended to be limiting. The structurally-integrated battery pack may include rows, columns, and/or layers of battery cells. In some implementations, structural foam may fill gaps between rows and/or columns of battery cells. There may be one or multiple layers of battery cells in a given structurally-integrated battery pack (e.g., a given panel). One or more structurally-integrated battery packs (e.g., panel(s)) may comprise a battery module and/or the entirety of the aircraft and/or vehicle battery pack, depending on the size and configuration of the aircraft and/or vehicle. The panel containing batteries may be bonded to the rest of the aircraft and/or vehicle structure, and/or or bolted such that it may be removable. Connections to electrical cabling and potentially offboard cooling channels may be included. Previously existing battery packs do not use structural foam as a structural component that helps support the battery cells and keep them in position. Further, the battery cells of the present application do not need to be individually encased by a rigid heavy metal casing because the structural foam of the present structurally-integrated battery pack may encase the battery cells (apart from the cooling channels) and provide cell isolation.

The disadvantages of previously existing standard battery pack designs (e.g., battery pack designs for aircraft) may include heavy weight, inefficient cooling, tendency to catch fire, lack of integral fire suppression and cell isolation, form shape and volume, and/or other disadvantages. By way of non-limiting example, the large rectangular prism or cubic form factor of existing battery packs and modules takes up valuable aircraft interior space and limits placement relative to a pack design that can conform to aircraft and/or vehicle curvature.

A structurally-integrated battery pack may comprise an outer skin, an inner skin, and/or other skins. The outer skin may include a first external surface, a first internal surface, and/or other surfaces. The inner skin may comprise a second external surface, a second internal surface, and/or other surfaces. The structurally-integrated battery pack may include structural foam disposed between the outer skin and the inner skin. The structural foam may surround and/or at least partially surround one or more battery cells disposed within the structurally-integrated battery pack. In some implementations, the structurally-integrated battery pack may include one or more layers of spongy foam. The one or more layers of spongy foam may be disposed on the structural foam and/or the battery cell surfaces such that the spongy foam surrounds and/or partially surrounds the one or more battery cells disposed within the structurally-integrated battery pack. The structural foam may include multiple voids. The multiple voids may include battery voids in which one or more battery cells may be disposed. The multiple voids may include one or more cooling channel. The cooling channel may include a vapor cooling channel through which vapor flows.

The battery cells disposed within the battery voids and/or the structural foam may form layers. The layers may comprise a first layer including a first structural foam layer, a second layer including a first battery disposed within a first battery void, a third layer including at least a partial structural foam layer, a fourth layer including a second battery disposed, a fifth layer including a second structural foam layer, and/or other layers. The layers may be sandwiched by the outer skin and/or inner skin to create a closed battery pack having isolated battery cells. In some implementations, the partial structural foam layer may at least partially form a cooling channel. The cooling channel may abut a surface of one or more battery cells included in the structurally-integrated battery pack. In some implementations, the structural foam may abut the first internal surface of the outer skin, at least a portion of the second internal surface of the inner skin, and/or other surfaces and/or skins.

The outer skin, the inner skin, the structural foam, the battery cells, and/or other features of the structurally-integrated battery pack may be incorporated into a structural element of an aircraft and/or vehicle. The structural element of the aircraft and/or the vehicle may include one or more of an exterior panel, a semi-monocoque or monocoque skin, a hull, a leading edge of an airfoil, a chassis, a structural spar of the aircraft and/or the vehicle, and/or other structural element of the aircraft and/or the vehicle. In some implementations, the outer skin and/or the inner skin may be comprised of one or more metals and/or composite materials.

In some implementations, the battery voids and/or cooling channels may be machined and/or molded into the structural foam. One or more surfaces of individual ones of the battery voids may be generally tangential to and/or offset from a curve of the outer skin and/or the inner skin. As such, the battery voids may accommodate rigid and/or straight-sided pouch battery cells and/or cylindrical battery cells within structural foam between a curved outer skin and/or a curved inner skin (e.g., creating a curved battery panel). One or more surfaces of the battery voids being generally tangential to and/or offset from a curve of the outer skin and/or the inner skin includes any orientation that maintains the aforementioned functional impact of encompassing straight and/or non-flexibly battery cells within a thin, curved (sometimes a complex curve) battery panel (i.e., the structurally-integrated battery pack).

The structurally-integrated battery pack may include multiple rows of battery cells for a given layer of battery cells. As such, a structurally-integrated battery pack may include a given number of columns, rows, and/or layers of battery cells. The battery cells may be mostly encased (e.g., fully encased except the portion of the battery cell surface that may abut one or more cooling channels) by structural foam and/or spongy foam disposed between the outer skin and/or the inner skin of the structurally-integrated battery pack. The battery cells within the multiple rows, columns, and/or layers may be connected in series and/or parallel. The structurally-integrated battery packed may be removably coupled to one or more structural elements of an aircraft and/or vehicle. A structural element may include a structural member and/or other component of aircraft and/or vehicle. In some implementations, the structurally-integrated battery pack may be bonded and/or bolted to one or more structural elements of the aircraft and/or the vehicle. As such, the structurally-integrated battery pack may and/or may not be removable. In some implementations, the structurally-integrated battery pack may be bonded and/or bolted to one or more non-structural elements of the aircraft and/or the vehicle. By way of non-limiting example, the battery pack may be integrated in to non-structural panels such as aero fairings, a car hood, one or more cosmetic panels, and/or other non-structural elements. The structurally-integrated battery pack may be bonded and/or bolted to any section and/or portion of the body of a vehicle.

These and other objects, features, and characteristics of the disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. As used in the specification and in the claims, the distinctions "first", "second", and/or "third" are used for clarity and distinction purposes and do not indicate order unless the context clearly dictates otherwise.

DETAILED DESCRIPTION

Figure 1A:
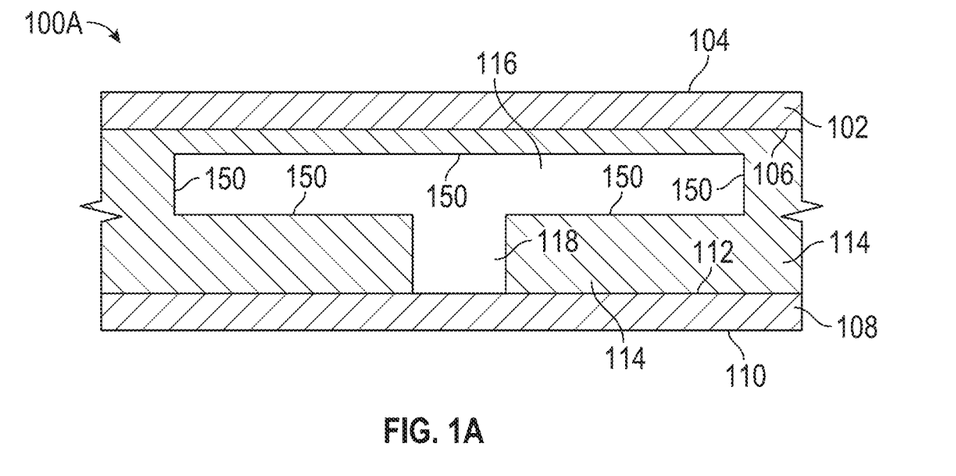
FIG. 1A illustrates a side view of at least a portion of a structurally-integrated battery pack, in accordance with one or more implementations.
Figure 1B:
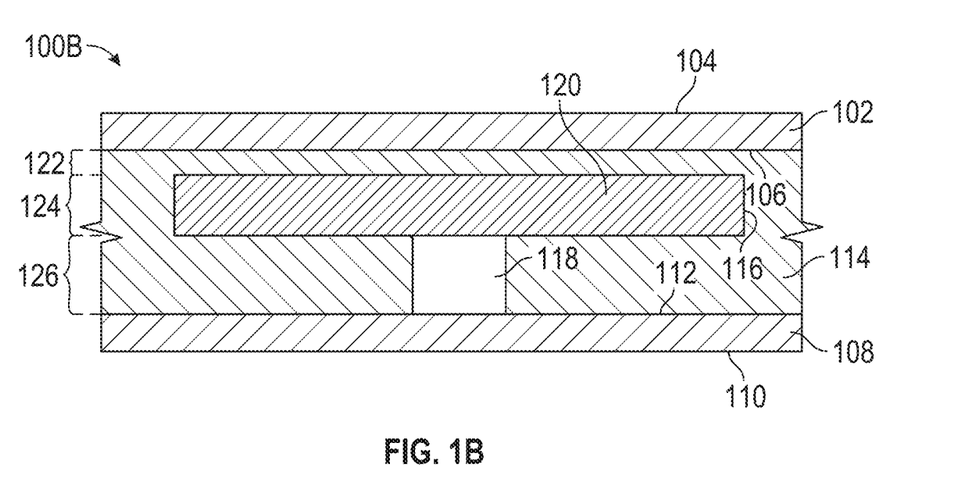
FIG. 1B illustrates a side view of at least a portion of a structurally-integrated battery pack, in accordance with one or more implementations

FIGS. 1A and 1B illustrate a side view of at least a portion of a structurally-integrated battery pack 100, in accordance with one or more implementations. FIG. 1A depicts structurally-integrated battery pack 100 without a battery cell disposed within the battery void 116. FIG. 1B depicts battery cell 120 disposed within the battery void 116. FIGS. 1A and 1B are described collectively as FIG. 1.

FIG. 1 illustrates a structurally-integrated battery pack 100 comprising an outer skin 102 and/or an inner skin 108. Outer skin 102 may comprise one or more surfaces. For example, outer skin 102 may comprise first external surface 104, first internal surface 106, and/or other surfaces. Inner skin 108 may comprise one or more surfaces. For example, outer skin 102 may comprise second external surface 110, second internal surface 112, and/or other surfaces. Outer skin 102, inner skin 108, and/or other skins may be comprised of one or more metals, composite materials, and/or other materials. By way of non-limiting example, outer skin 102, inner skin 108, and/or other skins may be comprised of aluminum. Outer skin 102 and/or inner skin 108 may be incorporated into a structural element and/or another element of an aircraft and/or vehicle. The structural element and/or the other element of the aircraft and/or vehicle may include, for example, one or more of an exterior panel, a skin, a hull, a leading edge of an airfoil, a chassis, a structural spar, winglets/wingtip extensions, conformal "fuel" tanks, drop tanks on pylons, access panels, aerodynamic fairings, cosmetic panels, and/or other structural elements and/or non-structural elements of the aircraft and/or the vehicle. In some implementations, outer skin 102 and/or inner skin 108 may be incorporated into the semi-monocoque skin and/or fully monocoque skin of an aircraft and/or vehicle.

Structural foam 114 may be disposed between outer skin 102 and/or inner skin 108. By way of non-limiting example structural foam 114 may include multiple voids. Structural foam 114 may surround one or more battery cells in structurally-integrated battery pack 100 and/or fill the space (except the voids) between outer skin 102 and inner skin 108. Structural foam 114 may abut first internal surface 106 of outer skin 102, at least a portion of second internal surface 112 of the inner skin, and/or other surfaces. Structural foam 114 may facilitate cell isolation and/or cell separation between battery cells included in structurally-integrated battery pack 100. Structural foam 114 may be a flame-retardant closed cell structural foam (e.g., Divinycell, Rohacell, and/or other structural foam). The cell separation in a flame-retardant closed-cell structural foam, the built-in cooling (e.g., cooling channels), and/or the fire suppression system of structurally-integrated battery pack 100 may provide significant safety advantages. In some implementations, the structural foam may prevent moisture and/or fluid intrusion into the battery cells and/or offer electrical insulation. The structural foam may include a foam having any qualities suitable for use as a structural foam within a vehicle. By way of non-liming example, a density of the structural foam may be around 3 lb/ft$^3$. By way of another non-limiting example, a density of the structural foam may be between 2.5 lb/ft$^3$ and 3.5 lb/ft$^3$. By way of another non-limiting example, the density of the structural foam may be between 3.5 lb/ft$^3$ and 6 lb/ft$^3$ and/or another density.

The multiple voids may include battery voids and one or more cooling channels. The portion of a single layer structurally-integrated battery pack 100 illustrated in FIG. 1 includes battery void 116, cooling channel 118, and/or other voids (not illustrated). Battery cells may be disposed within the battery voids of structurally-integrated battery pack 100. FIG. 1 may illustrate battery cell 120 disposed within battery void 116. The battery cells may include one or more pouch battery cells, cylindrical cell batteries, and/or other battery cells. Including pouch battery cells within structurally-integrated battery pack 100 may enable battery pack 100 to provide sufficient energy for achieving electric powered flight and/or range without sacrificing valuable volume on an aircraft due to the shape and/or packing efficiency of pouch battery cells.

The multiple voids may include one or more machined voids, and/or molded voids. In some implementations, structural foam 114 is machined such that a desired size and/or shape of the void and/or a surface (e.g., a curved surface that may abut one or more of outer skin 102 and/or inner skin 108) is machined out of structural foam 114. In some implementations, structural foam 114 is molded such that the multiple voids are molded into the structural foam. Structurally-integrated battery pack 100 may be a variety of sizes and/or shapes depending on voltage requirements, amperage requirements, airframe and/or vehicle shape, and/or other specifications. Machining and/or molding structural foam 114 may enable structural foam 114 to abut and/or fit a curve of one or more of inner skin 108 and/or outer skin 102. Machining and/or molding structural foam 114 may enable battery cells, which may be rigid and/or not curved, to fit within battery voids when the skin is curved. Structural foam 114 may accommodate aircraft curvature and/or complex shapes due to the ability to machine complex curved foam sections (to abut the outer skin and/or inner skin), and/or to machine voids for battery cells in the foam at any angle. By way of non-limiting example, the battery voids may be machined and/or molded such that one or more surfaces of the battery voids are generally tangential to the skin curvature of structurally-integrated battery pack 100. In some implementations, for extreme curvature, smaller battery cells and/or battery voids may be required. In some implementations, the multiple voids may made through a variety of other methods, for example, via Teflon tubes that are inserted during foam curing and then removed later to leave voids, and/or other methods.

The battery cells disposed within the battery voids and structural foam 114 may form layers within structurally-integrated battery pack 100. In some implementations, structurally-integrated battery pack 100 may comprise a single battery layer having multiple rows (e.g., going into the page, as visible in FIG. 3B) of battery voids and battery cells (e.g., spaced apart with structural foam 114 disposed between). The layers may comprise a first layer 122 including first structural foam layer, second layer 124 including first battery 120 disposed within first battery void 116, a third layer 120 including at least a partial structural foam layer and/or a cooling channel, and/or other layers. In some implementations, the partial structural foam layer of third layer 120 may at least partially form cooling channel 118. By way of non-limiting example, partially forming cooling channel 118 may include cooling channel 118 being formed by a void in structural foam 114 such that at least two sides of cooling channel 118 comprise and/or are formed of structural foam 114.

Structurally-integrated battery pack 200 may include one or more cooling channels 118. Cooling channel 118 may include a vapor cooling channel through which vapor flows. Previously existing designs required heavy liquid coolant channels and/or liquid coolant (e.g., glycol). Cooling channel 118 is configured such that vapor cooling is provided to the center of the individual battery cells within structurally-integrated battery pack 200. Vapor cooling may consist of air, nitrogen, and/or other coolant choices. Cold, dry air is readily obtained at high altitudes. However, moisture and particulate removal may be required on the ground. Nitrogen may be a good option for aircraft because it is inert, non-flammable, and easily obtained. In some implementations, nitrogen may be provided in gaseous form by an OBOGS system generating onboard oxygen and feeding nitrogen through the one or more cooling channels. In other implementations, an onboard nitrogen generating membrane or Pressure Swing Absorption (PSA) system may be used. In some implementations, nitrogen gas may be provided through onboard $LN_2$. By way of another example, the vapor cooling may include recirculated nitrogen that uses a heat exchanger without outside air and a blower to provide airflow over the battery cells.

Figure 2A:
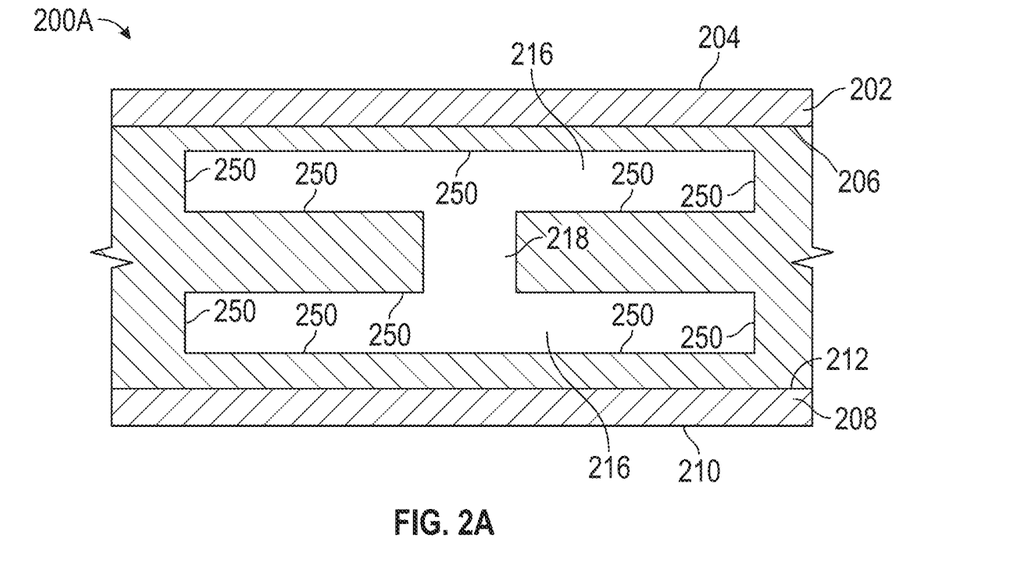
FIG. 2A illustrates a side view of at least a portion of a structurally-integrated battery pack, in accordance with one or more implementations.
Figure 2B:
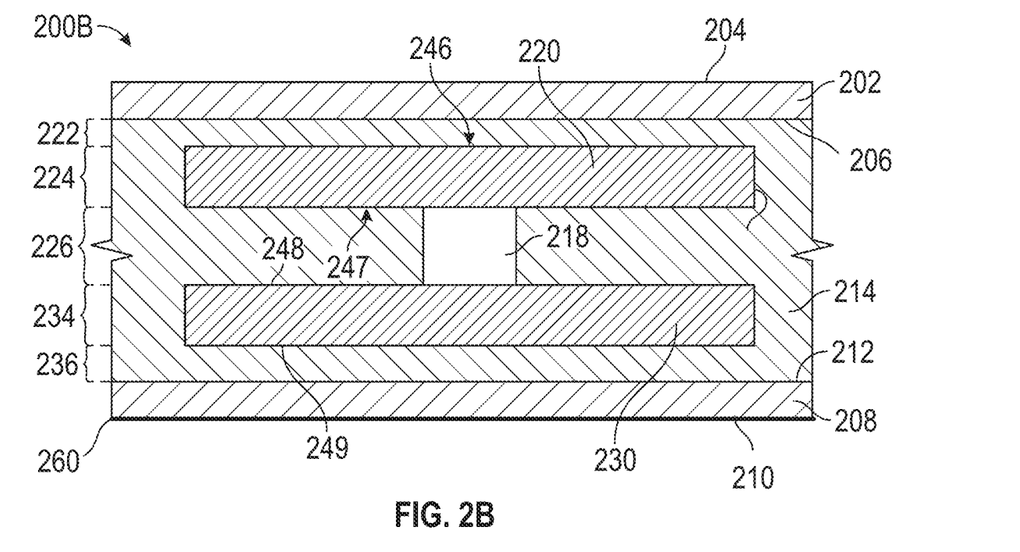
FIG. 2B illustrates a side view of at least a portion of a structurally-integrated battery pack, in accordance with one or more implementations.
Figure 2C:
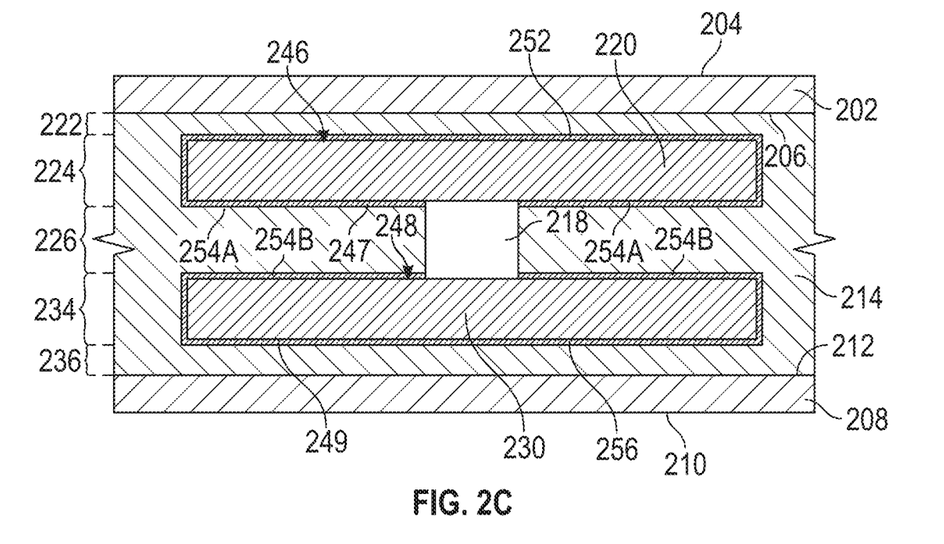
FIG. 2C illustrates a side view of at least a portion of a structurally-integrated battery pack, in accordance with one or more implementations.

FIGS. 2A-2C illustrate a side view of at least a portion of a structurally-integrated battery pack 200, in accordance with one or more implementations. FIG. 2A depicts structurally-integrated battery pack 100 without battery cells disposed within the battery void 116. FIGS. 2B and 2C depict first battery cell 220 and second battery cell 230 disposed within battery voids 216. FIGS. 2A, 2B, and 2C are described collectively as FIG. 2. Structurally-integrated battery pack 200 may include two battery layers having multiple rows (e.g., going into the page, as visible in FIG. 3B) of battery voids and battery cells (e.g., spaced apart with structural foam 114 disposed between). In some implementations, structurally-integrated battery pack 200 may include one or more features that are the same as and/or similar to structurally-integrated battery pack 100 (as illustrated in FIG. 1).

FIG. 2 illustrates a structurally-integrated battery pack 100 comprising an outer skin 202 and/or an inner skin 208. Outer skin 202 may comprise first external surface 204, first internal surface 206, and/or other surfaces. Inner skin 208 may comprise second external surface 210, second internal surface 212, and/or other surfaces. Outer skin 202, inner skin 208, and/or other skins may be comprised of one or more metals, composite materials, and/or other materials. Outer skin 202 and/or inner skin 208 may be incorporated into a structural element of an aircraft and/or vehicle. The structural element of the aircraft and/or vehicle may include, for example, one or more of a lightly loaded exterior panel, a semi-monocoque skin and/or a fully monocoque skin, a hull, a leading edge of an airfoil, a chassis, a structural spar, and/or other structural element of the aircraft and/or the vehicle.

Structural foam 214 may be disposed between outer skin 202 and/or inner skin 208. By way of non-limiting example structural foam 214 may include multiple voids. The multiple voids may include two or more battery voids 216, cooling channel 218, and/or other voids. Structural foam 214 may at least partially surround first battery cell 220 and/or second battery cell 230. Structural foam 214 may fill the space (besides the voids) between outer skin 202 and inner skin 208. Structural foam 214 may abut first internal surface 106 of outer skin 202, second internal surface 212 of the inner skin, and/or other surfaces. Structural foam 214 may sandwich the battery cells included in structurally-integrated battery pack 200. Structural foam 214 may enable cell isolation and/or cell separation between battery cells included in structurally-integrated battery pack 200. Structural foam 214 may be a flame-retardance closed cell structural foam (e.g., Divinycell, Rohacell, and/or other structural foam). In some implementations, structurally-integrated battery pack 200 may comprise a firewall layer 260 coupled to second external surface 210 of inner skin 208. In some implementations, firewall layer 260 (as illustrated in FIG. 2B may include a sheet of fabric and/or fire retardant material (e.g., Nomex fabric and/or other fabric) coupled to the second external surface 210 of inner skin 208.

The multiple voids may include battery voids 216 and/or cooling channel 218. Battery voids 216 may include a first battery void and a second battery void. A first battery cell 220 may be disposed within the first battery void. A second battery cell 230 may be disposed within the second battery void.

Battery cells 220 and 230 disposed within battery voids 216, and structural foam 214 may form layers within structurally-integrated battery pack 200. The layers may comprise a first layer 222 including a first structural foam layer, second layer 224 including first battery 220 disposed within first battery void 116, third layer 220 including at least a partial structural foam layer and/or a cooling channel, fourth layer 234 including second battery cell 230 disposed within a second battery void, fifth layer 236 including a second structural foam layer, and/or other layers. Second layer 224 and/or fourth layer 234 may include portions of structural foam 214 such that first battery 220 and second battery 230 are at least mostly surrounded (e.g., except for the cooling channels) by structural foam 214. In some implementations, by way of non-limiting example, first battery 220 and second battery 230 may be completely surrounded by structural foam 214 except for the one or more portions of first battery 220 and/or second battery 230 that abut cooling channel 218. First battery 220 and/or second battery 230 may be sandwich by one or more structural foam layers and/or partial structural foam layers (e.g., first layer 222, third layer 226, fifth layer 236, etc.). The partial structural foam layers may include one or more portions of structural foam 214 and/or one or more voids (e.g., cooling channel 218). Cooling channel may be disposed between first battery 220 and second battery 230. In some implementations, cooling channel 218 may be formed by the partial structural foam layer in third layer 226. By way of non-limiting example, structurally-integrated battery pack 200 may include two battery layers having multiple rows of batteries. In some implementations, second layer and/or the fourth layer include multiple rows of battery cells within battery voids.

As illustrated in FIG. 2C, in some implementations structurally-integrated battery pack 200 may include spongy foam 240 disposed between outer skin 202 and inner skin 208. Individual ones of battery voids 216 may include spongy foam 240 disposed on one or more surfaces of battery voids 216. In some implementations, battery voids 216 may include two or more battery void surfaces 250. Battery void surfaces 250 may comprise structural foam (see e.g., FIG. 2A) and/or spongy foam (see e.g., FIG. 2C) that define a shape of at least a portion of an individual battery void.

As illustrated in FIGS. 2B and 2C, first battery cell 220 may include a first top surface 246 that faces but may not abut first internal surface 206 of the outer skin 202. First top surface 246 may face but may not abut second top surface 248 of second battery cell 230. Second bottom surface 249 of second battery cell 230 may face but may not abut a second internal surface 212 of inner skin 208. In implementations having multiple rows of batteries, wherein second layer 224 and fourth layer 234 include multiple rows of battery cells within battery voids, first top surfaces of the battery cells in second layer 224 may face but may not abut first internal surface 206 of outer skin 202. First bottom surfaces of the battery cells in second layer 224 may face but not abut second top surfaces of the battery cells in fourth layer 234. Second bottom surfaces of the battery cells in fourth layer 234 may face but may not abut second internal surface 212 of inner skin 208.

As illustrated in FIG. 2C, in some implementations, first layer 222 may include a first spongy foam layer 252 between the first structural foam layer and first battery 220. Third layer 226 may include two partial spongy foam layers 254A and 254B sandwiching the partial structural foam layer. As such, a first partial spongy foam layer 254A may abut first battery 220, and/or a second partial spongy foam layer 254B may abut second battery 230. Fifth layer 236 may include a second spongy foam layer 256 disposed between the second structural foam layer and second battery 230. The spongy foam may be disposed on and/or coupled to one or more structural foam services and/or battery cell surfaces. In some implementations, second layer 224 and/or fourth layer 234 may include one or more portions of spongy foam disposed on one or more side surfaces of first battery cell 220 and/or second battery cell 230.

In some implementations, second layer 224 and/or fourth layer 234 may include multiple rows of battery cells within battery voids (e.g., going into the page in FIG. 2, not visible). First top surfaces of the battery cells in second layer 224 may abut first spongy foam layer 252. First bottom surfaces of the battery cells in second layer 224 may abut first partial spongy foam layer 254A and/or a top of cooling channel 218. Second top surfaces of the battery cells in fourth layer 234 may abut second partial spongy foam layer 254B and/or a bottom of cooling channel 218. In some implementations, the partial structural foam layer of third layer 226 may at least partially form cooling channel 218. By way of non-limiting example, partially forming cooling channel 218 may include cooling channel 218 being formed by a void in structural foam 214 such that at least two sides of cooling channel 218 comprise and/or are formed of structural foam 214.

Figure 3A:
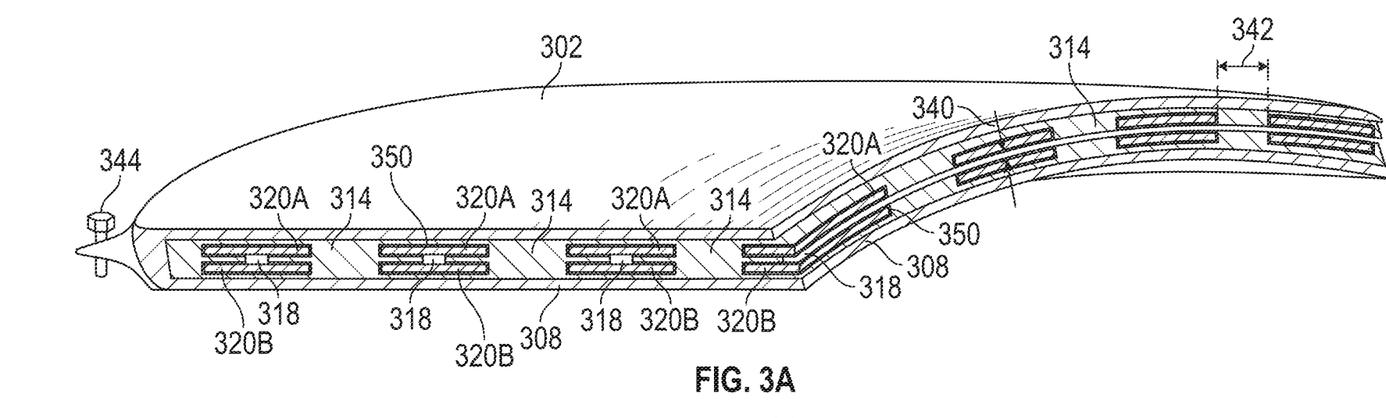
FIG. 3A illustrates a cutaway view of a structurally-integrated battery pack, in accordance with one or more implementations.

FIG. 3 illustrates a cutaway view of a structurally-integrated battery pack 300, in accordance with one or more implementations. Structurally-integrated battery pack 300 may include two battery layers and multiple rows and/or columns of batteries per layer. In some implementations, structurally-integrated battery pack 300 may include more than two layers (not illustrated). The cutaway view of structurally-integrated battery pack 300 illustrated in FIG. 3 depicts two battery layers and four rows of battery cells to form a curved panel. Structurally-integrated battery pack 300 may include one or more of outer skin 302, inner skin 308, structural foam 314, spongy foam 350, battery cells 320A in a first battery layer, battery cells 320B in a second battery layer, cooling channels 318, and/or other features.

Structurally-integrated battery pack 300 may be coupled to an aircraft and/or vehicle via bolts 344. Structural foam 314 may have a thickness. By way of non-limiting example, structural foam 314 may have a thickness between 0.75 and 1.5 inches. By way of another non-limiting example, structural foam 314 may comprise 1 in thick Divinycell foam. In some implementations, spongy foam 350 may surround and/or partially surround battery cells 320. Spongy foam 350 may have a thickness. By way of non-limiting example, spongy foam 350 may be ⅟₁₆ in. thick. Spongy foam 350 may comprise a low-density spongy foam. By way of non-limiting example, the low-density spongy foam may include a polyethylene foam, a polyester foam, and/or other foam. The low-density spongy foam may have a density between 1.5 lb/ft³ and 2.5 lb/ft³. By way of non-limiting example, the low-density spongy foam may comprise a polyethylene foam having a density of about 2 lb/ft³.

Battery cells 320A in the first battery layer and battery cells 320B in the second battery layer may be separated by vertical spacing 340. Vertical spacing 340 may represent a height of one or more cooling channels 318. By way of non-limiting example, the vertical spacing between battery cells 320A in the first battery layer and battery cells 320B in the second battery layer may include 0.1-.2 inches. By way of another non-limiting example, the vertical spacing between battery cells 320A in the first battery layer and battery cells 320B in the second battery layer may include 0.1-1 inches. Cooling channels 318 may run the length (e.g., through multiple rows within a given column between two given layers) of structurally-integrated battery pack 300 and/or between battery cells of a given and/or between battery cells 320A in the first battery layer and battery cells 320B in the second battery layer. Cooling channels 318 may have a width. By way of non-limiting example the width of cooling channels 318 may be 0.1 in-.5 in. In some implementations, cooling channels 318 may have a width of 0.25 inches. In some implementations, cooling channels 318 may include rectangular shaped channels, cylindrical shaped channels, and/or other shaped channels.

Individual ones of the battery cells 320A in the first battery layer and/or individual ones of the battery cells 320B in the second battery layer may be separated by horizontal spacing 342. Horizontal spacing 342 may represent a distance between one or more rows of individual batteries in the first battery layer and/or the second battery layer. By way of non-limiting example, horizontal spacing 342 may be between 0.1-1 in. By way of another non-limiting example, the vertical spacing between individual battery cells 320A in different rows of the first battery layer and/or individual battery cells 320B in different rows of the second battery layer may include 0.5 in.

Figure 3B:
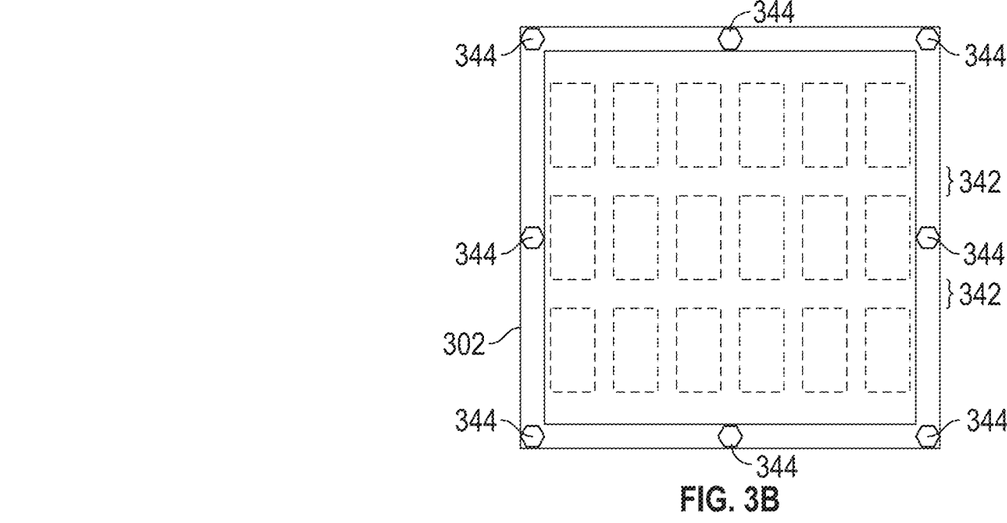
FIG. 3B illustrates a top view of a structurally-integrated battery pack, in accordance with one or more implementations.

FIG. 3B illustrates a top view of structurally-integrated battery pack 300, in accordance with one or more implementations. Structurally-integrated battery pack 300 may be curved. The top view of structurally-integrated battery pack 300 illustrated in FIG. 3B may depict a panel including 3 rows and 6 columns of batteries 320A in the first layer of battery cells under the surface of outer skin 330. Structurally-integrated battery pack 300 may have dimensions. By way of non-limiting example, structurally-integrated battery pack 300 may include a 2'×2' panel. In some implementations, structurally-integrated battery pack 300 may include one or more flanges comprised of composite and/or metal for bolting structurally-integrated battery pack 300 to the skin (e.g., the semi-monocoque skin and/or fully monocoque skin) and/or other structural element of an aircraft and/or vehicle.

Figure 4:
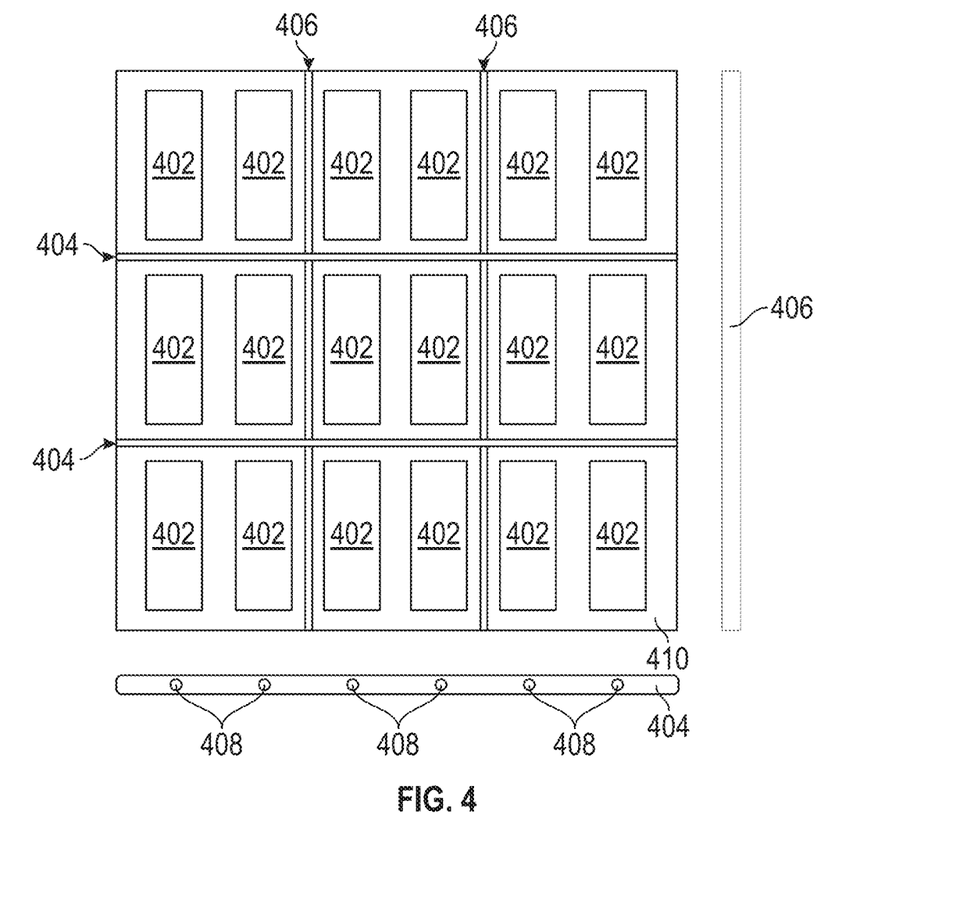
FIG. 4 illustrates a top view of a structurally-integrated battery pack, in accordance with one or more implementations.

FIG. 4 illustrates a top view of a layer of a structurally-integrated battery pack 400, in accordance with one or more implementations. In some implementations, structurally-integrated battery pack 400 may include one or more ribs 404 and/or spars 406. In some implementations, the structural foam included in structurally-integrated battery pack 400 may comprise a low density structural foam surrounding battery cells 402. Ribs 404 and/or spars 406 may provide additional and/or lightweight support for structurally-integrated battery pack 400. Ribs 404 may include one or more holes 408 that may align with cooling channels within structurally-integrated battery pack 400. By way of non-limiting example, battery pack 400 may include low density structural foam (e.g., 2 lb/ft$^3$ foam, and/or other density foam). By way of non-limiting example, ribs 404 and/or spars 406 may comprise one or more of carbon fiber, fiberglass, titanium, aluminum, and/or other materials.

Figure 5:
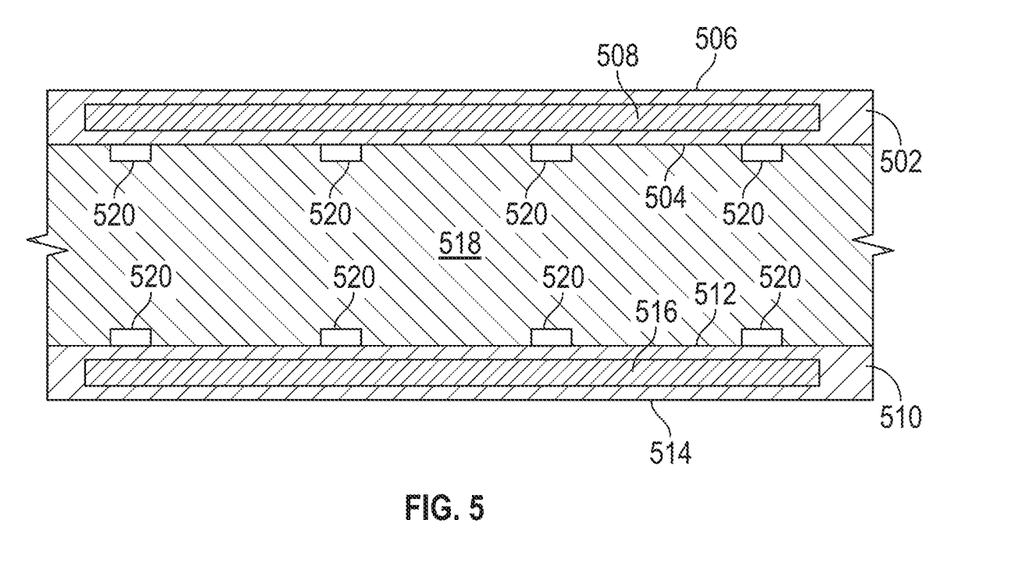
FIG. 5 illustrates a side view of at least a portion of a structurally-integrated battery pack, in accordance with one or more implementations.

FIG. 5 illustrates a side view of at least a portion of a structurally-integrated battery pack 500, in accordance with one or more implementations. In some implementations, structurally-integrated battery pack 500 may include a battery pack wherein the batteries are included within the skin. Structurally-integrated battery pack 500 may include an outer skin 502. Outer skin 502 may comprise first external surface 506, a first internal surface 504, and/or other surfaces. One or more first electrodes may be disposed within outer skin 502 between first external surface 506 and first internal surface 504. First electrode 508 may be disposed within outer skin 502 between first external surface 506 and first internal surface 504. Structurally-integrated battery pack 500 may include an inner skin 510. Inner skin 510 may comprise second external surface 514, second internal surface 512, and/or other surfaces. One or more second electrodes may be disposed within outer skin 510 between second external surface 514 and second internal surface 512. Second electrode 516 may be disposed within outer skin 510 between second external surface 514 and second internal surface 512.

Structurally-integrated battery pack 500 may include structural foam 518 disposed between the outer skin and the inner skin. Structural foam 518 may be the same and/or similar to structural foam described herein in connection with FIGS. 1-3. The structural foam may include multiple voids. The multiple voids may include cooling channels 520. The multiple voids and/or cooling channels 520 may be the similar to the multiple voids and/or cooling channels described herein in connection with FIGS. 1-4. Cooling channels 520 may be at least partially formed by structural foam 518. By way of non-limiting example, structural foam 518 may form one or more sides and/or tops of cooling channels 520. One or more sides of cooling channels 520 may abut and/or be made up of first internal surface 504 and/or second internal surface 512. In some implementations, cooling channels 520 may be U-shaped channels that for an enclosed channel when abutting first internal surface 504 and/or second internal surface 512.

Emerging structural composite battery cells (e.g., Multi-functional Energy Storage (MES) Composites comprising battery materials in high-strength composites) tend to overheat. The thickness required to obtain the desired structural support and/or carry a mechanical load may further the overheating issues. The implementation described herein including outer skin 502 and/or inner skin 510 being batteries, structural foam 518 disposed between outer skin 502 and inner skin 510, and/or structural foam 518 including cooling channels 520 may help solve the overheating, thickness, and/or structural/load bearing issues. Typically, carbon composites transfer heat relatively well laterally but have difficulty transferring heat axially due to the successive layers of insulating epoxy in the existing structural composite battery cells. This prevents efficient heat removal from the center of a thick carbon composite layup. The embodiment described herein solves this problem and may enable emerging structural composite battery cells to be a viable option for aircrafts and/or vehicles. Outer skin 502 and/or inner skin 510 being batteries, structural foam 518 disposed between outer skin 502 and inner skin 510, and/or structural foam 518 including cooling channels 520 may enable the battery to be split into thinner skins with structural foam in between to provide the same structural support and/or mechanical load bearing abilities as a thick structural composite batter cell, while reducing and/or solving the cooling problems.

Figure 6:
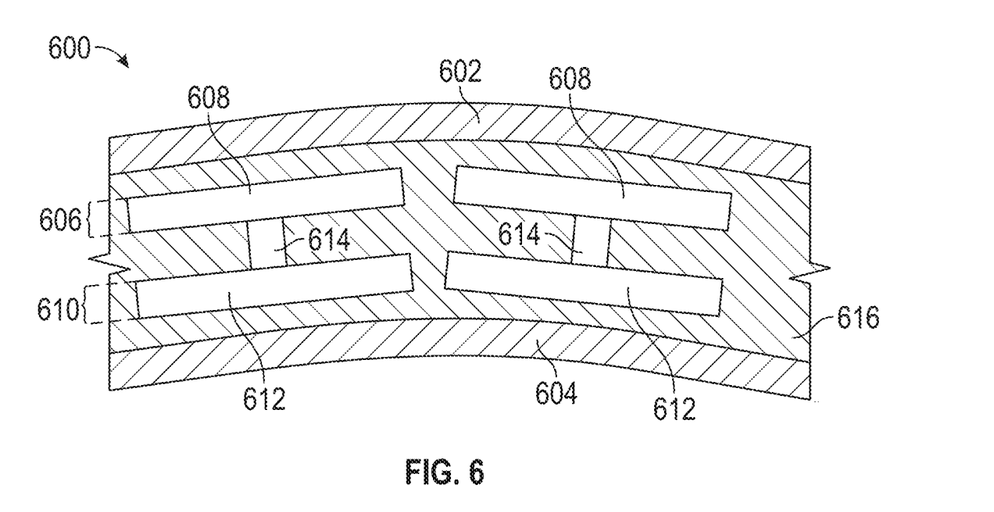
FIG. 6 illustrates a side view of at least a portion of structurally-integrated battery panel in a curved panel form, in accordance with one or more implementations.

FIG. 6 illustrates a side view of at least a portion of structurally-integrated battery pack 600 in a curved panel form, in accordance with one or more implementations. Structurally-integrated battery pack 600 may include a curved outer skin 602, a curved inner skin 604, a first battery layer 606 including first battery voids 608, a second battery layer 610 including second battery voids 612, cooling channels 614, structural foam 616, and/or other features. First battery layer 606 may include battery cells disposed within first battery voids 608 (not depicted). Second battery layer 608 may include battery cells disposed within second battery voids 612 (not depicted).

Structural foam 616 may be machined and/or molded to include first battery voids 608, second battery voids 612, and/or cooling channels 614. Machining and/or molding structural foam 116 may enable the battery cells, which may be rigid and/or not curved, to fit within first battery voids 608 and/or second battery voids 612 when the skin is curved. First battery voids 608 and/or second battery voids 612 may be generally tangential to curved outer skin 602 and/or curved inner skin 604. In some implementations, one or more battery void surfaces 620 may be generally tangential to curved outer skin 602 and/or curved inner skin 604. One or more surfaces of the battery voids being generally tangential to and/or offset from a curve of curved outer skin 602 and/or curved inner skin 604 may include any orientation that maintains the aforementioned functional impact of encompassing thin, long, narrow, rigid, straight edged, and/or non-flexible battery cells within a thin, curved (sometimes a complex curve) structurally-integrated battery pack in a curved panel form. One or more additional columns of battery voids and/or battery cells may be included in structurally-integrated battery pack 600 (e.g., a 3 row by 5 column by 2 layers configuration as illustrated in FIG. 3B, and/or any other configuration). In some implementations, for extreme curvature, smaller battery cells and/or battery voids may be required.

Figure 7:
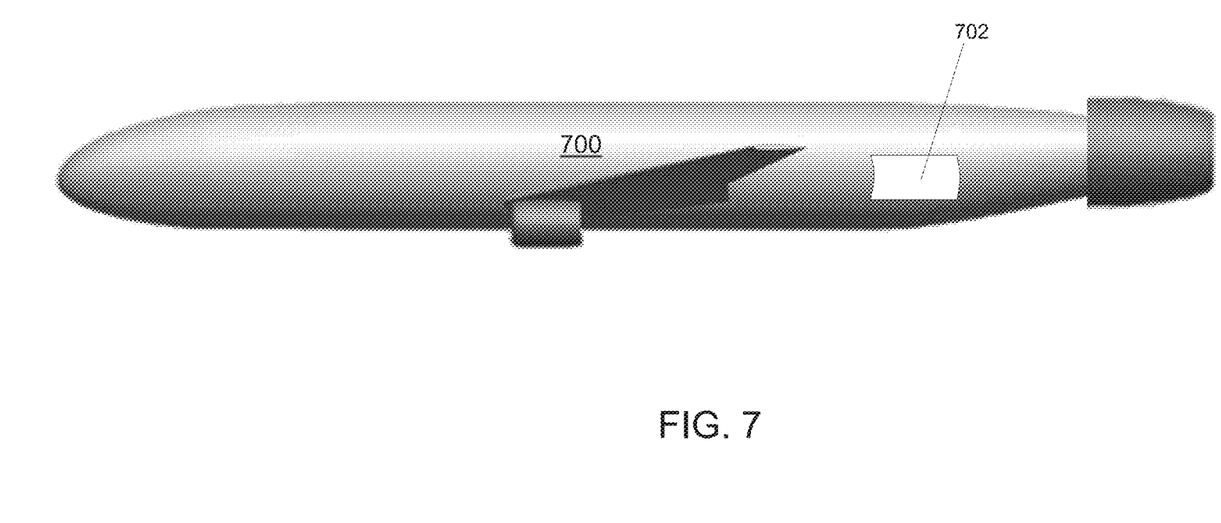
FIG. 7 illustrates structurally-integrated battery pack incorporated into a structural element of an aircraft, in accordance with one or more implementations.

FIG. 7 illustrates structurally-integrated battery pack 702 incorporated into a structural element of an aircraft 700, in accordance with one or more implementations. Structurally-integrated battery pack 702 may be incorporated into the skin of aircraft 700 (e.g., the semi-monocoque skin and/or a fully monocoque skin). In some implementations, structurally-integrated battery pack 702 may make up a portion of the skin of aircraft 700. Structurally integrated battery pack 702 may be coupled to (e.g., bolted, and/or otherwise coupled) to aircraft 700. Battery pack 702 may be coupled to any portion of aircraft 702. In some implementations, multiple battery packs 702 (not pictured) may be coupled to aircraft 702.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A structurally-integrated battery pack incorporated into a structural element of an aircraft and/or vehicle, the structurally-integrated battery pack comprising:
 an outer skin comprising a first external surface and a first internal surface;
 an inner skin comprising a second external surface and a second internal surface;
 structural foam disposed between the outer skin and the inner skin, the structural foam including battery voids and one or more cooling channels; and
 battery cells disposed within the battery voids, wherein the battery cells within the battery voids and the structural foam form layers, the layers comprising a first layer including a first structural foam layer, a second layer including a first battery disposed within a first battery void, and a third layer including at least a partial structural foam layer, wherein the partial structural foam layer at least partially forms a cooling channel,
 wherein the outer skin, the inner skin, the structural foam, and the battery cells are incorporated into the structural element of an aircraft and/or vehicle.

2. The structurally-integrated battery pack of claim 1, wherein the outer skin and/or the inner skin is comprised of one or more metals and/or composite materials.

3. The structurally-integrated battery pack of claim 1, wherein the structural foam abuts both the first internal surface of the outer skin and at least a portion of the second internal surface of the inner skin.

4. The structurally-integrated battery pack of claim 1, wherein the battery voids and/or the one or more cooling channels are machined voids.

5. The structurally-integrated battery pack of claim 1, wherein the structural foam is molded such that the battery voids and/or the one or more cooling channels are molded into the structural foam.

6. The structurally-integrated battery pack of claim 1, wherein an individual battery void has two or more battery void surfaces comprising structural foam and/or spongy foam that define a shape of at least a portion of an individual battery void.

7. The structurally-integrated battery pack of claim 6, wherein the two or more battery void surfaces are generally tangential to and offset from a curve of the outer skin and/or the inner skin.

8. The structurally-integrated battery pack of claim 1, wherein the cooling channels are vapor cooling channels through which vapor flows.

9. The structurally-integrated battery pack of claim 1, wherein the partial structural foam layer forms the cooling channel along one or more surfaces of the first battery.

10. The structurally-integrated battery pack of claim 1, wherein the first structural foam layer abuts the first internal surface of the outer skin and the second structural foam layer abuts the second internal surface of the inner skin.

11. The structurally-integrated battery pack of claim 1, wherein the second layer further includes the structural foam disposed at one or more sides and/or ends of the first battery pack such that the second layer comprises the first battery pack surrounded by structural foam.

12. The structurally-integrated battery pack of claim 1, wherein the layers further comprise a fourth layer including a second battery disposed within a second battery void such that the cooling channel is disposed between the first battery and the second battery, and fifth layer including a second structural foam layer.

13. The structurally-integrated battery pack of claim 12, wherein the second layer and the fourth layer include multiple rows of the battery cells within the battery voids, such that first top surfaces of the battery cells in the second layer face but do not abut the first internal surface of the outer skin and first bottom surfaces of the battery cells in the second layer face but do not abut second top surfaces of the battery cells in the fourth layer, and second bottom surfaces of the battery cells in the fourth layer face but do not abut the second internal surface of the inner skin.

14. The structurally-integrated battery pack of claim 12, wherein the first layer further includes a first spongy foam layer between the first structural foam layer and the first battery, the third layer further includes two partial spongy foam layers sandwiching the partial structural foam layer such that a first partial spongy foam layers abuts the first battery and a second partial spongy foam layer abuts the second battery, and the fifth layer further includes a second spongy foam layer between the second structural foam layer and the second battery.

15. The structurally-integrated battery pack of claim 14, wherein the second layer and the fourth layer include multiple rows of the battery cells within the battery voids, wherein first top surfaces of the battery cells in the second layer abut the first spongy foam layer, first bottom surfaces of the battery cells in the second layer abut the first partial spongy foam layer and a top of the cooling channel, and second top surfaces of the battery cells in the fourth layer abut the second partial spongy foam layer.

16. The structurally-integrated battery pack of claim 1, wherein the battery cells are pouch battery cells and/or cylindrical cell batteries.

17. The structurally-integrated battery pack of claim 1, further comprising a firewall layer between the structural foam and the second internal surface of the inner skin.

18. The structurally-integrated battery pack of claim 1, wherein the structural foam comprises a high density structural foam.

19. The structurally-integrated battery pack of claim 1, wherein the structural foam comprises a low density structural foam, and the structurally-integrated battery pack further comprises one or more spars and/or ribs disposed between the inner skin and the outer skin and within the structural foam.

20. The structurally-integrated battery pack of claim 1, wherein the structural element of the aircraft and/or the vehicle includes one or more of an exterior panel, a semi-monocoque or monocoque skin, a hull, a leading edge of an airfoil, a chassis, and/or a structural spar of the aircraft and/or the vehicle.

21. A structurally-integrated battery pack incorporated into a structural element of an aircraft and/or vehicle, the structurally-integrated battery pack comprising:
 an outer skin comprising:
  a first external surface and a first internal surface;
  one or more first electrodes disposed within the outer skin between the first external surface and the first internal surface; and
 an inner skin comprising:
  a second external surface and a second internal surface;

one or more second electrodes disposed within the inner skin between the second external surface and the second internal surface; and structural foam disposed between the outer skin and the inner skin, the structural foam including cooling channels.

22. The structurally-integrated battery pack of claim 21, wherein the cooling channels are machined voids.

23. The structurally-integrated battery pack of claim 21, wherein the structural foam is molded such that the cooling channels are molded into the structural foam.

24. The structurally-integrated battery pack of claim 21, wherein the cooling channels are vapor cooling channels through which vapor flows.

* * * * *